United States Patent [19]

Stenseth et al.

[11] 3,903,117

[45] Sept. 2, 1975

[54] COLOR STABILIZATION OF REFINED MALEIC ACID ANHYDRIDE

[75] Inventors: Raymond E. Stenseth, St. Louis; Ronald J. Boyer, Festus, both of Mo.; Richard J. Sheehan, Palos Hills, Ill.

[73] Assignee: Monsanto Company, St. Louis, Mo.

[22] Filed: July 31, 1972

[21] Appl. No.: 276,549

Related U.S. Application Data

[63] Continuation-in-part of Ser. No. 41,116, May 27, 1970, abandoned.

[52] U.S. Cl. .............................................. 260/346.8
[51] Int. Cl.² ........................................ C07D 307/60
[58] Field of Search .......................... 260/346.8 M

[56] References Cited
UNITED STATES PATENTS 3,586,703    6/1971    Martinez et al................. 260/346.8

OTHER PUBLICATIONS

Cram et al., Organic Chemistry, McGraw–Hill Book Co., (1959), pp. 304–305.
Fieser et al., Advanced Organic Chemistry, Reinhold Publ. Co., (1961), p. 392.
Beilstein's Handbuch Organische Chemie, Julius Springer Publ. Co., (1922), Vol. V, p. 300.
Rosenfeld et al., Chemical Abstracts, (1967), Vol. 66, 44918.

*Primary Examiner*—Henry R. Jiles
*Assistant Examiner*—Bernard I. Dentz
*Attorney, Agent, or Firm*—N. E. Willis; J. E. Maurer; F. D. Shearin

[57] ABSTRACT

Refined maleic anhydride is provided with improved color stability by the addition of a treating agent comprising organic compounds containing a labile halogen.

10 Claims, No Drawings

3,903,117

COLOR STABILIZATION OF REFINED MALEIC ACID ANHYDRIDE

CROSS-REFERENCES TO RELATED APPLICATIONS

This application is a continuation-in-part of application Ser. No. 41,116 filed May 27, 1970, now abandoned.

BACKGROUND OF THE INVENTION

This invention relates to the color stabilization of refined dicarboxylic acid anhydrides. More particularly, it relates to the color stabilization of refined maleic anhydride.

Anhydrides of certain dicarboxylic acids are commercially available to the consumer in either solid or molten form. Although these anhydrides are classified as chemically stable compounds, some discoloration of the solid material may be detected after extended storage periods. This rate of discoloration is more pronounced particularly when the anhydrides are maintained in their molten state for extended periods at elevated temperatures.

Maleic anhydride, for example, is often shipped in molten form in heated, insulated tank cars and is thus maintained in this state for long periods of time. Under such conditions, the molten maleic anhydride will frequently darken and become discolored.

Maleic anhydride can be prepared by the vaporphase oxidation or organic compounds such as benzene, toluene, naphthalene, methyl naphthalene, phenol, cresol, benzophenone, furan, biphenyl, furfural, n-butane, 1-butene, 2-butene, butadiene, heptane, isooctane, crotonaldehyde and crotonic acid, employing a large excess of air. By-products of the above reaction include other organic acids, chromogenic bodies, carbon monoxide, carbon dioxide and water. Crude maleic anhydride is generally dark in color, and although crude maleic anhydride can be refined to a substantially color-free material, color reappears over a period of time as hereinable described. Color is an undesirable characteristic of maleic anhydride and, if present before or during processing, can cause deleterious effects in resulting products, such as plastics, where proper color is an important feature of the material.

The prior art discloses various methods for refining crude maleic anhydride to obtain a high grade product of low color. One such method is disclosed in U.S. Pat. No. 2,296,218 to Middleton, wherein crude maleic anhydride containing volatile color imparting compounds produced as by-products in the partial oxidation of organic compounds is treated in the liquid state with a modification agent selected from the group consisting of the oxides and hydroxides of sodium, potassium, lithium, calcium, zinc and magnesium, and the halides of zinc, iron and aluminum and reaction products thereof. Thereafter, the treated maleic anhydride is subjected to distillation, leaving the darkening impurities in the distillation residue.

The prior art also discloses various methods for improving the storage color stability of dicarboxylic acid anhydrides. One such method is disclosed in U.S. Pat. No. 3,115,503 wherein color stabilizing amounts of ethylenediaminetetracetic acid are added to a molten cyclic anhydride during the preparation process or thereafter. Alternatively, the acid is added to the finely divided solid cyclic anhydride prior to compressing into tablets or briquettes.

Another method is taught in U.S. Pat. No. 3,586,703 wherein small amounts of a color stabilizer are incorporated into refined maleic anhydride. The stabilizers were such various inorganic compounds as hydrochloric acid, hydrobromic acid, silver chloride, barium nitrate, alkali or alkali metal sulfates, chlorides or bromides.

SUMMARY OF THE INVENTION

Despite the known prior art efforts to improve the color stability of maleic anhydride, there remains a need for further improvement. It is an object of the present invention, therefore, to provide color stabilized maleic anhyride. Another object of the present invention is to provide a color stabilizing amount of a treating agent. Still another object of the present invention is to significantly retard discoloration of solid and molten refined maleic anhydride during storage. Yet another object of the present invention is to provide a process for color stabilization of refined maleic anhydride by the introduction of novel treating agents.

These and other objects are achieved by introducing into refined maleic anhydride a color stabilizing amount of a treating agent to form a composition comprising a major amount of refined maleic anhydride and a color stabilizing amount of an organic compound containing a labile halogen.

For the purposes of this invention the term "labile halogen" is defined as a halogen which is prone to undergo ionization or dissociation. Such a compound gives a positive result with the classical silver nitrate test. The term "refined maleic anhydride" refers to that maleic anhydride having very little or no color that is suitable for use in commerce without further purification steps.

Color stabilized compositions obtained through use of the treating agents of this invention exhibit superior color properties as will be demonstrated by test results hereinafter presented.

It has been discovered that organic compounds containing a labile halogen, i.e., organically bound labile fluorides, chlorides, bromides and iodides, are superior treating agents for the color stabilization of refined maleic anhydride. Although not to be construed in a limitating sense, the following organic compounds containing a labile halogen can be used to color stabilize refined maleic anhydride: benzal chloride; benzyl chloride, benzotrichloride; ortho- and para-nitrochlorobenzene; orthoand para-toluenesulfonyl chloride; allyl chloride; methanesulfonyl chloride; sodium p-toluenesulfonchloramide; N-chlorosuccinimide; chlorosulfonic acid; 8-quinolinesulfonyl chloride; and meso-$\alpha,\alpha'$-dichlorosuccinic acid.

The acid halides of aliphatic and aromatic carboxylic acids are also useful. Examples of such carboxylic acid halides include acetyl chloride; adipoyl chloride, anisoyl chloride, acryloyl chloride, butyryl chloride, camphoroyl chloride, caproyl chloride, cinnamoyl chloride, cyanoacetyl chloride, formyl chloride, fumaroyl chloride, glutaryl chloride, isophthaloyl chloride, levulinoyl chloride, lauroyl chloride, malonyl chloride, oleoyl chloride, oxalyl chloride, propinonyl chloride, pyruvoyl chloride, salicyloyl chloride, stearoyl chloride, suberoyl chloride, terephthaloyl chloride, thioacetyl chloride, and toluoyl chloride. It has been found that acryloyl chloride, benzoyl chloride, fumaroyl chloride, and phthaloyl chloride are quite effective.

It has been discovered that organic compounds containing a non-labile halogen are not beneficial as treating agents for the color stabilization of maleic anhydride. Examples of organic compounds containing a non-labile halogen, and thus outside the present invention, are chlorobenzene and carbon tetrachloride.

The maleic anhydride can be color stabilized by treatment with the treating agents of the present invention according to numerous procedures. Successful results have been achieved by adding the color stabilizer directly to molten refined maleic anhydride in the pipeline at the manufacturing site. It is sometimes desirable to treat refined molten maleic anhydride in the melting kettle or in a heated tank car. In general, the means of adding the treating agent is not critical, since the treating agents herein are usually soluble in the maleic anhydride.

Since the halogen-containing treating agents of the present invention can be introduced into maleic anhydride in the refined state, the method of introducing the treating agent is much simpler in contrast to many prior art methods wherein a cooking agent must be added to the crude anhydride during processing. Those prior art methods of introducing a color stabilizer during processing generally result in the polymerization or carbonization of impurities, thus making them separable by distillation. The present invention is distinguished therefrom in that no distillation or other processing steps after treatment is necessary in the method described herein.

Comparatively small amounts of the treating agents of the present invention are effective to inhibit color formation in refined maleic anhydride. It is to be recognized that there is some variation in properties among different lots and sources of maleic anhydride. Furthermore, some lots of maleic anhydride are more difficult to treat than others. Accordingly, there will be some variation in the optimum amount of treating agent in the treated product depending upon the product and the treating agent selected. Thus, the concentration of the treating agent within the treated product may vary from a trace amount, as for example 0.01 parts per million by weight, to 1000 parts per million by weight or greater. Generally, from 0.01 to 100 parts per million by weight is sufficient.

DESCRIPTION OF PREFERRED EMBODIMENTS

The following examples illustrate the advantageous and unexpected results that are achieved through the use of the treating agents of this invention. These examples are intended to be illustrative only and are not to be construed in a limiting sense.

EXAMPLES 1 THROUGH 15

Examples 2 through 15 demonstrate the effectiveness of a variety of halogen-containing treating agents in improving the heat stability of refined maleic anhydride. The first example is given to show the color that develops in untreated maleic anhydride.

Untreated samples from various lots of commercially pure maleic anhydride were melted in a 25 mm. by 200 mm. test tube and the initial or "melt" colors were determined at sample temperatures from about 55°C. to about 70°C. by comparison with the APHA color standards. The standard used to indicate the quantity or intensity of color of products in solution form is known as the APHA standard color test. This test is one developed by the American Public Health Association and is known as the Hazen Platinum Cobalt Scale, a description of which is found in volume 2, part 13, on page 2425 of the 6th edition of "Standard Methods of Chemical Analysis," by F. J. Welcher, editor.

Temperatures of the untreated samples were then raised to 140°C. and color values were determined after 2 hours, 4 hours, 6 hours and 24 hours of heating. The color values for the untreated maleic anhydride samples from a number of tests were averaged and are presented as Example 1 in Table I below where the treating agent is indicated as "None." After 4 hours at 140°C., the average APHA color of all untreated samples was 500. The average initial or "melt" color was 15.

Likewise, additional samples of the aforementioned maleic anhydride were melted and treated with various halogen-containing treating agents within the scope of the present invention. APHA color determinations for each of the treated samples were made in the manner described above. These APHA color determinations are presented in Table I below. Except as noted, the halogencontaining treating agent was added to the molten maleic anhydride at a concentration of 50 parts per million. Where the phrase "parts per million" is used herein, the "parts" are parts by weight based upon the weight of the dicarboxylic acid anhydride.

TABLE I

| EXAMPLE NO. | TREATING AGENT | APHA Melt Color | APHA Color at 140°C | | | |
|---|---|---|---|---|---|---|
| | | | 2 Hrs. | 4 Hrs. | 6 Hrs. | 24 Hrs. |
| 1 | None | 15 | 300 | 500 | — | — |
| 2 | Sodium p-toluene-sulfonchloramide | 15 | 50 | 100 | 125 | 500+ |
| 3 | N-Chlorosuccinimide | 15 | 50 | 80 | 90 | 250 |
| 4 | Allyl chloride" | 15 | 35 | 50 | 60 | 100 |
| 5 | 8-Quinolinesulfonyl chloride | 15 | 25 | 30 | 35 | 80 |
| 6 | Acryloyl chloride | 15 | 20 | 25 | 30 | 50 |
| 7 | Meso-α,α'-dichlorosuccinic acid | 10 | 15 | 20 | 25 | 60 |
| 8 | p-Toluenesulfonyl chloride | 15 | 30 | 35 | 40 | 90 |
| 9 | Fumaroyl chloride | 25 | 25 | 40 | 45 | 80 |
| 10 | Benzyl chloride" | 15 | 25 | 30 | 35 | 60 |
| 11 | Benzoyl chloride" | 15 | 15 | — | — | 80 |
| 12 | o-phthaloyl chloride" | 15 | 30 | — | — | 90 |

TABLE I – Continued

| EXAMPLE NO. | TREATING AGENT | APHA Melt Color | APHA Color at 140°C | | | |
|---|---|---|---|---|---|---|
| | | | 2 Hrs. | 4 Hrs. | 6 Hrs. | 24 Hrs. |
| 13 | Methanesulfonyl chloride[a] | 20 | 30 | 35 | 40 | 60 |
| 14 | Benzotrichloride | 10 | 15 | — | — | 70 |
| 15 | o-Toluenesulfonyl chloride | 15 | 25 | 35 | 40 | 125 |

[a]One drop added

Thus, it can be seen that organic compounds containing a labile halogen, and mixtures of such compounds, impart outstanding color stabilization to refined maleic anhydride. Monocarboxylic acid halides such as benzoyl chloride and acryloyl chloride, as well as polycarboxylic acid halides such as fumaroyl chloride and phthaloyl chloride, demonstrate superior results as color stabilizing treating agents for refined maleic anhydride.

Although the invention has been described in terms of specified embodiments which are set forth in considerable detail, it should be understood that this is by way of illustration only, and that the invention is not necessarily limited thereto, since alternative embodiments and operating techniques will become apparent to those skilled in the art in view of the disclosure. Accordingly, modifications are contemplated which can be made without departing from the spirit of the described invention.

We claim:

1. A composition comprising a major amount of refined maleic anhydride and a color stabilizing amount of an organic compound containing a labile halogen.

2. A composition of claim 1 wherein the stabilizing amount comprises from about 0.01 to about 1000 parts per million by weight of the refined maleic anhydride.

3. A composition of claim 1 wherein the stabilizing amount comprises from about 0.01 to about 100 parts per million by weight of the refined maleic anhydride.

4. A composition of claim 1 wherein the organic compound is selected from the group consisting of meso-$\alpha,\alpha'$ dichlorosuccinic acid, benzyl chloride, benzal chloride, benzotrichloride, and mixtures thereof.

5. A composition of claim 1 wherein the organic compound containing the labile halogen comprises a monocarboxylic acid halide.

6. A composition of claim 5 wherein the monocarboxylic acid halide is selected from the group consisting of benzoyl chloride and acryloyl chloride.

7. A composition of claim 1 wherein the organic compound containing the labile halogen comprises a polycarboxylic acid halide.

8. A composition of claim 7 wherein the polycarboxylic acid halide is selected from the group consisting of fumaroyl chloride and phthaloyl chloride.

9. A method which comprises introducing into refined maleic anhydride a color stabilizing amount of an organic compound containing a labile halogen.

10. A method of claim 9 wherein the organic compound containing the labile halogen is selected from at least one of the group consisting of meso-$\alpha,\alpha'$-dichlorosuccinic acid, benzyl chloride, benzal chloride, benzotrichloride, fumaroyl chloride, acryloyl chloride, benzoyl chloride and phthaloyl chloride.

* * * * *